April 8, 1924.
F. L. HINMAN
SAFETY CAR STOP
Filed Aug. 17, 1922    3 Sheets-Sheet 1
1,489,598
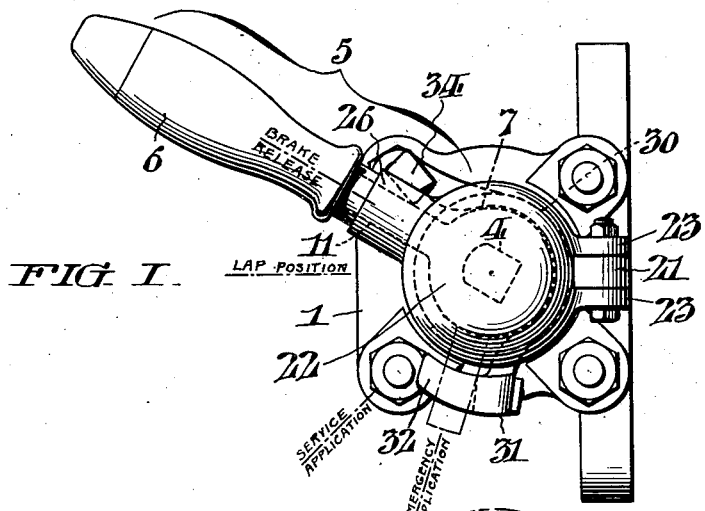
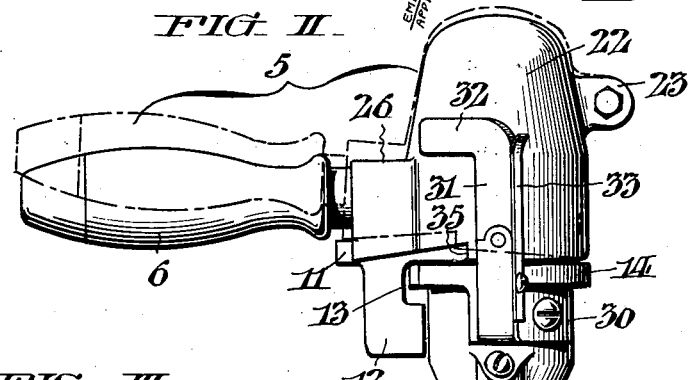
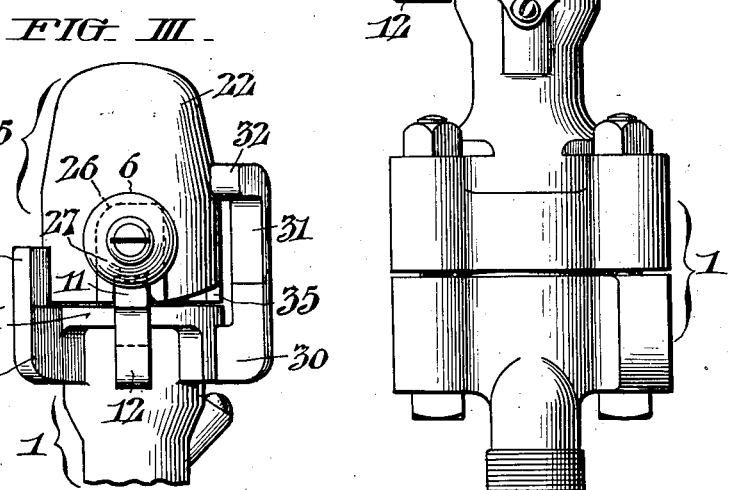
WITNESSES:
INVENTOR:
Frank L. Hinman,
BY
ATTORNEYS.

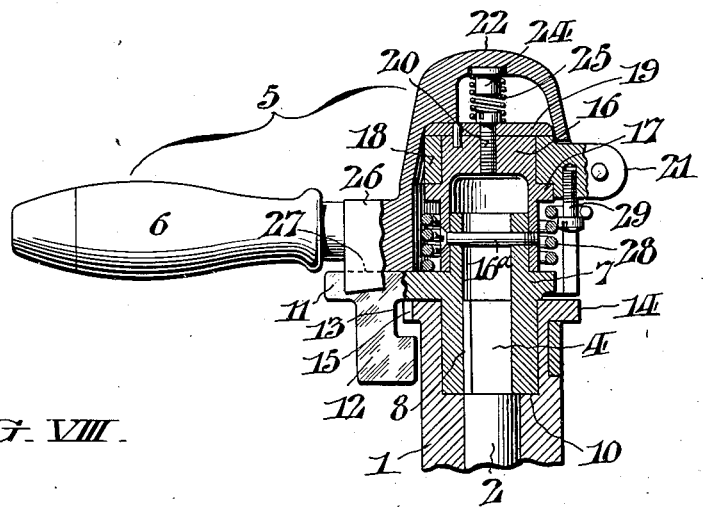
FIG. IV
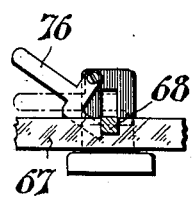
FIG. VIII
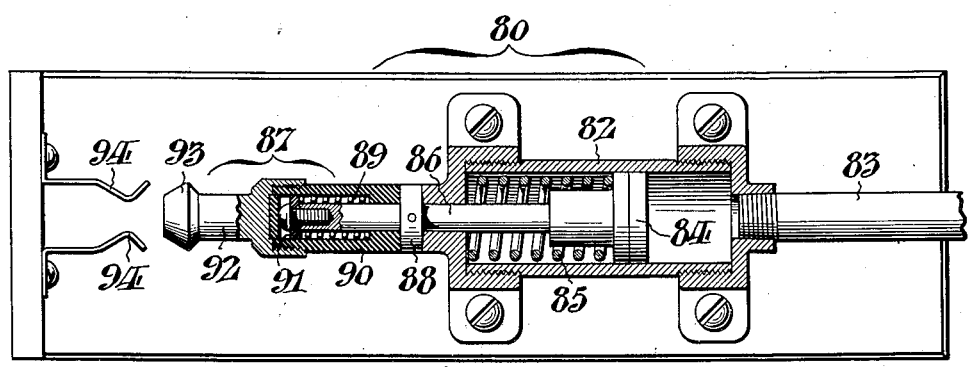
FIG. IX
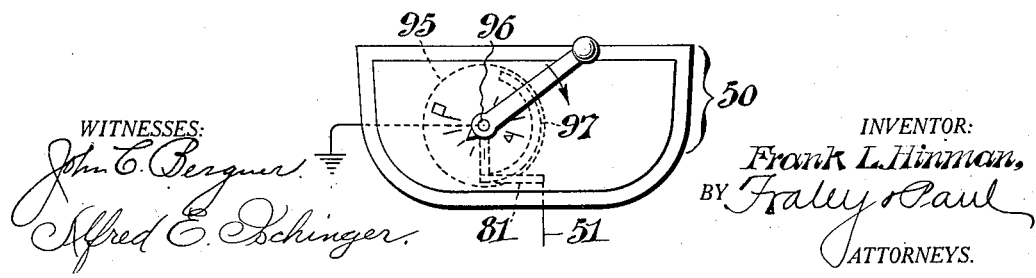
FIG. X

April 8, 1924. 1,489,598
F. L. HINMAN
SAFETY CAR STOP
Filed Aug. 17, 1922 3 Sheets-Sheet 3
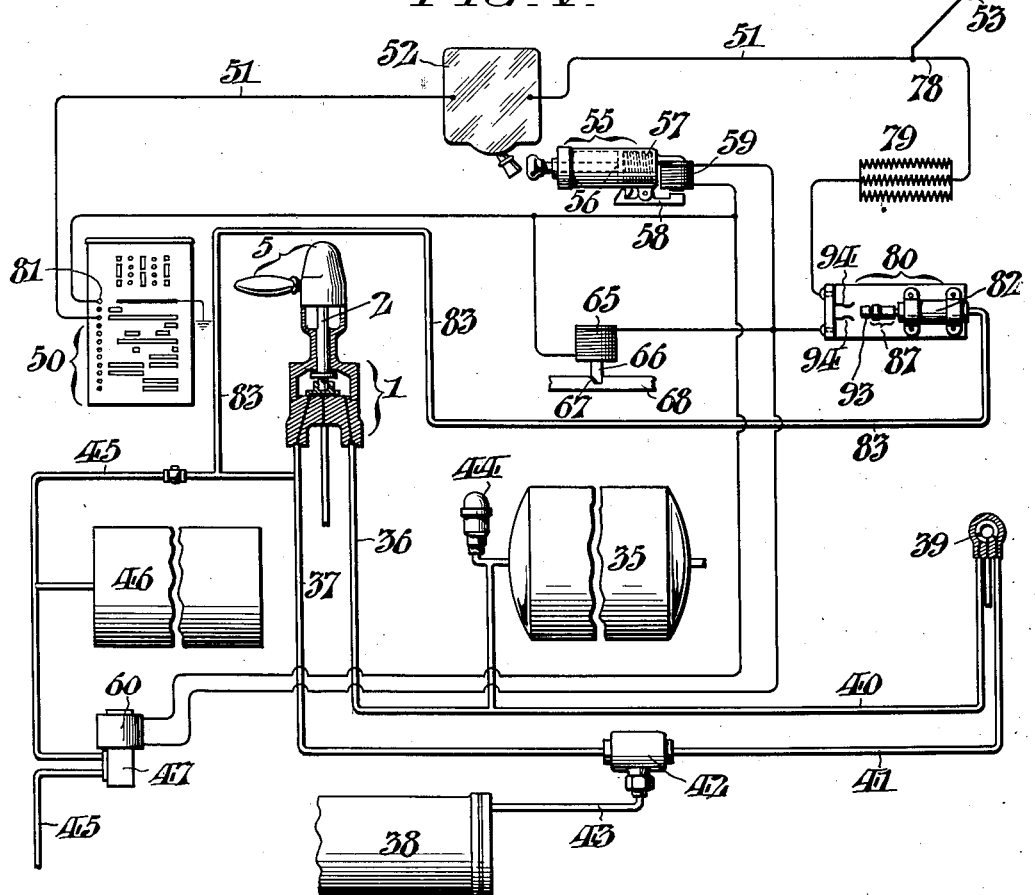
FIG. V.
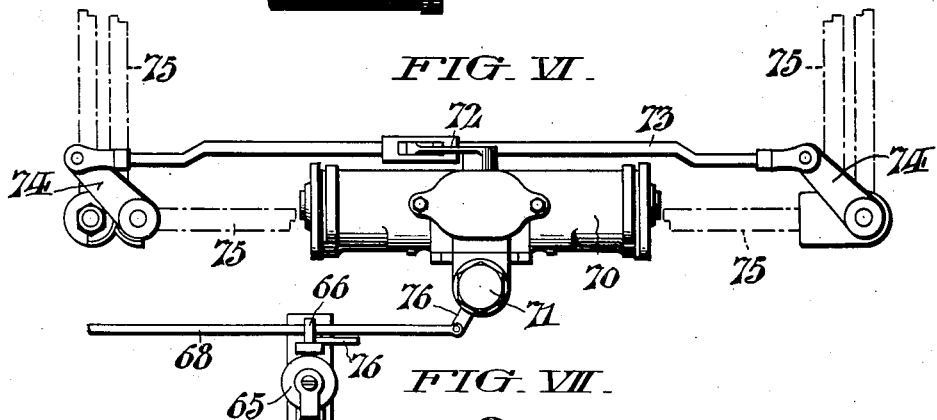
FIG. VI.
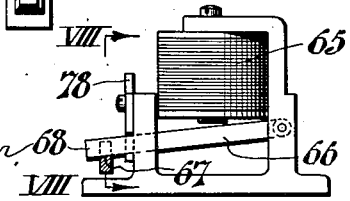
FIG. VII.
WITNESSES:
John E. Bergner
Alfred E. Eschinger
INVENTOR:
Frank L. Hinman,
BY Haley & Paul
ATTORNEYS.

Patented Apr. 8, 1924.

1,489,598

UNITED STATES PATENT OFFICE.

FRANK L. HINMAN, OF PHILADELPHIA, PENNSYLVANIA.

SAFETY CAR STOP.

Application filed August 17, 1922. Serial No. 582,355.

*To all whom it may concern:*

Be it known that I, FRANK L. HINMAN, a citizen of the United States, residing at Philadelphia, county of Philadelphia, and State of Pennsylvania, have invented certain new and useful Improvements in Safety Car Stops, whereof the following is a specification, reference being had in the accompanying drawings.

My invention relates to safety car stops useful in connection with railway operation. The primary object of my invention is to minimize in the operation of railways, accidents due to human fallacy either through carelessness or negligence on the part of engineers or motormen or through the loss of the faculties of such operatives as occurs when suddenly stricken with unconsciousness. This I accomplish by providing hand controlled braking apparatus by which the brakes may be released manually so long as the weight or pressure of the hand of the operator is maintained upon the handle which controls the brake system, but which automatically sets the brakes upon withdrawal of the weight or pressure of his hand. Such a scheme has previously been applied to power control mechanisms of railways, but I believe that it is novel to apply it as I have done to the braking mechanism.

The mechanism which I have provided not only accomplishes its function of automatically setting the brakes when the operatives hand is removed but is expressly designed to prevent improper tampering therewith by the operator whereby release could be maintained notwithstanding removal of the hand.

In order that the braking of a train or car may be accomplished in a minimum period of time, especially when the car or train is moving at its maximum rate of speed, I not only effect the setting of the brakes, but the application of sand to the rails to facilitate braking to the fullest extent and simultaneous shutting off of the power. In some cases, as for example in the operation of so called "one man cars," I further provide for release of the emergency exit doors so as to be operable by the passengers in emergencies but locked against tampering during normal operation of the car. The several conditions just described are brought about automatically upon the removal of the hand of the operator from the brake handle, or they may be brought about manually by a short movement of the right hand of the operative which is used on the brake handle.

A further object of my invention is to provide a safety stop system of the above described character capable of being installed on cars without requiring any extensive changes or alterations in them or their standard equipments or operating accessories.

Other objects and attendant advantages of my invention will become readily apparent from the detailed description which follows while its scope is comprehended in the appended claims.

In the drawings, Fig. I is a plan view of the operating handle for the brake valve showing the same as assembled with the valve.

Fig. II, is an elevation of the assemblage shown in Fig. I.

Fig. III, is an elevation viewed from the left of Fig. II.

Fig. IV, is an axial sectional view through the valve assemblage.

Fig. V, is an illustration, more or less diagrammatically represented of the car equipment both standard and supplemental which includes the air brake piping system, and the electric circuits and accessories embodied in my improved car stop.

Fig. VI, is an illustration of a typical door operating engine, showing the means by which the same is normally held locked against operation.

Fig. VII, is an elevation on an enlarged scale of the means aforesaid.

Fig. VIII, is a detailed section of the locking means viewed in the direction of the arrows VIII—VIII in Fig. VII.

Fig. IX, is a detail view in axial section of a pneumatic actuating device for a control switch in the auxiliary circuit; and Fig. X, is a plan view of the controller showing the rotatable sector contact disk whereby connection is made for current taken from the main power circuit to energize the auxiliary circuit in which are interposed various electric devices designed to bring about other actions or events necessary or desirable in connection with the stoppage of a car other than a brake application.

Referring first to Figures I, II, III and

IV, the operating valve designated at 1, is of a standard type such as commonly used in of controlling the application of the brakes of a car or train. It has the usual axial valve stem 2 with a squared or appropriately flattened upper end 4 for engagement of a valve handle. In accordance with my invention the usual valve handle is replaced by a specially constructed handle herein comprehensively indicated at 5 and which will be observed to comprise two main parts, a part designated by the numeral 6 which I will term for convenience, the grip member, and a part 7 which may appropriately be called a socket member, the two being joined (as will be presently manifested) by what amounts virtually to a universal connection. Said socket member is in the form of a cylindrical boss axially apertured as at 8 to fit the upper end 4 of the valve stem 2, the lower end of the member 7 being accommodated in a recess 10 in the upper portion or neck of the valve casing. Such arrangement as is usual with valve construction allows of the ready removal of the operating handle when desired. The socket member 7 has extending laterally therefrom a lever projection 11 in turn formed with a depending lug is suitably notched as at 13 to co-operate with the retaining flange 14 at the top of the valve body so as to be normally held in place in a manner well understood. At one point in its periphery, the flange 14 is notched as at 15 to clear the lug 12 when the handle is to be removed. The reduced upper end of the socket member 7 is surmounted by an axially aligned extension 16 secured by a screw 16ª and has a circumferential flange 17 about midway of its height, said flange serving as a bearing for a swivel member 18 rotatable about the extension 16. The swivel member is held in place by a cap plate 19 secured to the extension 16 by an axial screw 20. Integrally formed with said swivel member 18 is a laterally projecting ear 21 provided for the pivoting of the grip member 6 in such manner that the latter is allowed a limited free vertical movement for a purpose to be later described. The grip member has at one end a bonnet 22 adapted to fit over the extension member 16 concealing and protecting various portions of the handle against tampering and is in turn provided with ears 23 for pivotal attachment to the lug 21 aforesaid. Within the upper end of the bonnet 22, I have interposed between an axial projection 24 of the latter and the head of the screw 20 in the extension member 16, a compression spring 25 which is adapted to urge the handle member 6 upwardly about its pivotal attachment with the socket member 7. The enlargement 26 on the grip member of the handle directly adjacent the bonnet 22 is slotted as at 27 to interlock with the lever projection 11 of the socket member 7 such interlocking being normally maintained by hand pressure upon the grip member 6 in opposition to the spring 25 so that the valve may be operated manually in the usual manner.

In order that upon release of the handle and consequent release of the interlock between the grip member 6 and the socket member 7 that the latter may be automatically shifted to bring the valve to emergency application position, I have provided a coiled spring 28, which encircles the socket member 7 being attached thereto at one end and at the other to a screw 29 let into the swivel member 18. Thus it will be seen that in case the motorman or engineer releases his hold upon the handle the valve is caused to shift to the emergency position (Figure I) as a result of which the brakes will be immediately applied to bring the car or train to a halt.

The precise position in which the grip member is shown in Figure I is that of brake release or the position normally occupied by the handle when the car is in motion with brakes released. The service application is made in the usual manner simply by rotating the grip member counterclockwise to the position of service application.

In order to permit the operative to remove his hand from the grip member so that he can perform other duties which may be required of him incidental to a service stop, I have provided an arcuate yoke piece 20 which is secured about the top of the valve casing 1, said yoke piece having attached thereto at one end a latch member 31 with an overhanging extension 32 beneath which the brake handle may be engaged and the interlock between the grip member and the socket member maintained. The length of the overhanging extension 32 it will be noted is such that the interlock aforesaid is also maintained after making an emergency application manually.

The engagement of the grip member beneath the overhang 32 of the latch 31 is facilitated by pivoting the latter to the yoke 30, a leaf spring 33 tending to maintain the latch yieldingly in the position shown in the drawings. An integral vertical extension 34 at one extremity of the yoke 30 serves as a stop to limit clockwise movement of the handle member 6 upon disengagement of the latter from the companion handle member 6.

The extent of free relative movement of the parts 6 and 7 after removal of the handle is limited by a stop shoulder 35 afforded by notching the lower edge of the bonnet 22 as best shown in Figure II, the spring 28 serving at this time to maintain the lever projection 11 at rest against said stop. In replacing the handle, the parts 6 and 7 are of course first interengaged as previously described.

Referring now to Figure V, where I have shown in addition to the usual car equipment including the air brake system and the power circuit, the several auxiliary devices embodied in my invention by which the power is shut off, sanding initiated, and the emergency door unlocked concurrently with the application of the brakes in effecting emergency stops. Briefly described, the usual air brake system as herein shown comprises a control valve 1, such as already described said valve being in communication with the storage tank indicated at 35 through a pipe line 36 and in turn through a pipe 37 with the brake cylinder partially shown at 38. In connection with these appurtenances, an emergency valve conventionally reperesented at 39 is also sometimes provided, this valve being in communication with the storage tank through a pipe line 40 and with the brake cylinder 38 through a pipe line 41, a double check valve 42 being interposed in the branch pipe 43 which leads to the brake cylinder. The storage tank is protected by a safety valve 44 interposed in the pipe line. In cases where a sander is provided the same may be supplied with compressed air through a branch pipe 45 communicating with the pipe 37 and leading first to a sander reservoir 46 thence to the sander (not shown) under control of a valve 47. In the power circuit which is only partly illustrated herein, the controller is indicated at 50, shown as connected by a conductor 51 through an interposed circuit breaker 52 to the trolley conventionally represented at 53. The remainder of the circuit through the motors has purposely been omitted to avoid confusion in the diagram.

Coming now to the elements which are additional or supplemental to the standard car equipment, a device 55 is provided for actuating the circuit breaker to open the main or power circuit. This device is in the form of a cylinder having a piston 56 normally locked in the position shown with a spring 57 compressed behind the same, by a pivoted dog or latch 58 operatively associated with an electromagnet 59. When the rod to which the piston 56 is secured is released by energization of the magnet 59, the force of the spring 57 causes the projecting end of the piston rod to strike the handle of the circuit breaker thus opening the main circuit as aforesaid and shutting off the power to the motors. As a means for operating the valve 47 which controls the air line to the sander, I have incorporated in said valve an electromagnet 60, which may be effective upon the valve to open the same in any convenient manner and its details have therefore been omitted from the drawings. In the case where a car is run by a single operative, I prefer to maintain the emergency doors locked against manual actuation during normal operation of the car, and to this end have provided an electromagnet 65 operative upon an armature 66 whose free end coacts with a notch 67 in the actuating rod 68 of the door engine illustrated separately in Figure VI. Pausing at this juncture to permit of a cursory examination of this illustration which shows in plan an engine such as ordinarily used for operating the doors of cars, the structure will be observed to comprise a double ended cylinder 70 which through pre-ordered operation of an attached control valve 71 causes a lever 72 to shift a link 73 in one direction or the other to swing crank levers 74—74 directly connected to the car doors indicated in dot and dash lines at 75—75. The control lever 76 of the valve 71 is arranged to be actuated manually through the medium of the connecting link or rod 68 previously described. In the event that the doors intended for emergency exits in one man operation of the car are used as service outlets as is sometimes the case in two man operation, the armature 66 may be held elevated above the province of the link 68 by a swingable stop 76, see Figures VII and VIII.

The electromagnets 59, 60 and 65 are interposed in an auxiliary circuit which has its origin at one end in a connection 78 with the conductor 51 of the main power circuit and conducts current through fixed resistances 79 to an automatic switch 80 thence through the several magnets aforesaid to a terminal point or contact 81 in the controller box 50, (see also Figure X). Pausing now to refer to Figure IX which illustrates the details of the switch device 80, the latter is shown as comprising a pneumatic cylinder 82 in communication by way of a pipe or conduit 83 with the pipe line 37 of the brake system. The air supplied to the cylinder 82 from this source is effective upon a piston 84 to urge the same in opposition to a compression spring 85 interposed forward of the piston so that the piston rod 86 is moved outwardly. Upon the projecting end of the piston rod 86, is mounted a switch plug member 87 which is slidable upon said rod but normally held in retracted position against a collar 88 by a spring 89 accommodated in an axial bore of the insulated portion 90 of said switch member, the spring being compressed between the base of the bore and an insulating washer 91 secured by a screw to the outer end of the piston rod. The metallic portion or tip 92 of the switch plug member has a tapered head 93 which, during the forward motion of the piston rod 86, is forced between a pair of companion spring contacts 94 which are connected in the auxiliary circuit as clearly shown in Figure V. The characteristic construction of the device 80 as represented in Figure IX will show that upon the exhausting of the air from the cylinder 82 the spring 85 becomes immediately effective in retracting the piston 84 and its rod. The head 93 of the switch plug member 87 however, will not be instantly withdrawn from between the contacts 94, but will follow with a snap action shortly afterward when sufficient energy has been stored in the spring 89 by compression imposed during the rearward movement of the piston rod 86. By virtue of the snap action just described, the possibility of the formation of arcs is effectively prevented. Referring once more to Figure V, it is to be especially noted that the switch device 80 controls the auxiliary circuit so that the magnets 59, 60 and 65 are either simultaneously energized or denergized in accordance with the position of the switch members.

It is preferable that the auxiliary circuit be energized only when power through the motors of the car is on two or more points and as a means of securing this result a contact segment disk 95 is mounted to the actuating stem 96 of the controller 50 whose details are more clearly shown in Figure X. The disk 95 is of insulation and carries a segmental contact plate or sector 97 adapted to cooperate in wiping contact with the element 81 previously referred to which is really in the form of a spring brush as shown in Figure X. By properly proportioning the arcuate length of the contact segment 97 and positioning the cooperative fixed contact 81, the auxiliary circuit is energized only when the handle of the controller is in running positions as already suggested.

The operation of my improved car stop is as follows:

To make the ordinary service stops the brake handle 5 is shifted from the release position shown in Figure I to that of service application, so that the brakes will be applied in the usual manner as hereinbefore explained. Although the contacts 94 are bridged as a result of the projection of the plug member 93 by reason of air being supplied the cylinder 82 through the operation of the valve 1, no current passes through the auxiliary circuit since the controller is in off position and the magnet 59 of the circuit breaker actuating device is therefore not energized.

Brake release is effected simply by shifting the handle back in a clockwise direction to the brake release position whereupon the car can proceed as before. If at the time of the running of the car the operative should through negligence, carelessness or as a result of being suddenly stricken with paralysis or apoplexy remove his hand from the brake handle, the grip member 6 immediately swings upward about its pivotal connection with the socket member 7 under the force of the spring 25 as already understood, as a result of which the socket member is freed to shift counterclockwise under the action of the spring 28 to the emergency application position illustrated in dot and dash lines in Figure I. Assuming the power in the car to be on at this time, air from the storage tank 35 (Figure V) will be directed by way of the pipe line 36—37 to the brake cylinder 38 with consequent immediate application of the brakes. Concurrently with such action, a portion of the air released into the pipe line 37 is conducted through the pipe 83 to enter the cylinder 82 of the switch device 80 causing its piston 84 to be forced forward to close the auxiliary circuit through the contacts 94 thereby resulting in simultaneous energization of the magnets 59, 60 and 65. As a consequence of the action of the magnet 59, the dog 58 of the device 55 is withdrawn and the rod 56 shot forward under the push of the spring 57 to shift the handle of the circuit breaker 52 thereby causing the same to open the main circuit and consequently to shut off the power to the motors. The energization of the magnet 60 will in its turn actuate the valve 47 to allow passage of air through the conduit or pipe 45 to the sander and thus to initiate the application of sand to the rails; while the energization of the magnet 65 brings about withdrawal of the armature 66 to unlock the emergency door operating mechanism so that the same may be actuated manually and permit the exit of the passengers.

From the characteristic arrangement of the various elements embodied in my invention as described in the foregoing, it will be apparent that in order to make a manual emergency application, it is not necessary nor even desirable to move the controller to off position. Such a stop may be effected simply by shifting or turning the brake handle 5 as far as possible to the right which, it will be remembered, corresponds to the emergency position of the control valve 1. It is furthermore clear from the foregoing that the car stop organization of my invention is applicable to cars without necessitating any extensive changes in them or their standard appurtenances or equipments.

Having thus described my invention, I claim:

1. A safety car stop comprising in combination with a brake system, a removable pivoted brake handle containing mechanism for automatically unlatching its component parts upon removal of the hand of the operative therefrom by a limited upward movement on its pivot.

2. A safety car stop comprising in combination with an air brake system having an interposed control valve, a removable pivoted valve handle containing mechanism for automatically shifting the valve to emergency brake applying position upon removal of the hand of the operative therefrom by rocking upwardly on its pivot a limited degree.

3. A safety car stop comprising in combination with an air brake system having an interposed control valve, a valve handle including a socket member directly engageable with the stem of the control valve and tending automatically to shift the valve to emergency position, and an associated grip member normally adapted to be held interlocked with the socket member under pressure of the hand of the operative.

4. A safety car stop comprising in combination with an air brake system having an interposed control valve, a valve handle including a socket member directly engageable with the stem of the control valve and urged under spring action to automatically shift the valve to emergency position, and an associated grip member normally adapted to be held interlocked with the socket member under pressure of the hand of the operative.

5. A safety car stop comprising in combination with an air brake system having an interposed control valve, a valve handle including a socket member directly engageable with the stem of the control valve tending to automatically shift the valve to emergency position, and an associated grip member connected to the socket member with provision for limited independent movement but normally adapted to be held interlocked therewith under pressure of the hand of the operative.

6. A safety car stop comprising in combination with an air brake system having interposed control valve, a valve handle including a socket member directly engageable with the stem of the control valve, and an associated grip member adapted to be normally held interlocked with the socket member under pressure of the hand of the operative, and a spring connecting the two handle members effective in causing the valve to be shifted automatically to emergency position upon release of said handle.

7. A safety car stop comprising in combination with an air brake system having an interposed control valve, a valve handle including a socket member directly engageable with the stem of the control valve and urged under spring action to automatically shift the valve to emergency position, and an associated pivotally attached grip member with a slot for interlocking with a lever projection of said socket member, such interlock being normally maintained against spring action under pressure of the hand of the operative upon the handle.

8. A safety car stop comprising in combination with car equipment including a main electric power circuit with an interposed circuit breaker, and a brake system; means coordinated with the brake system for actuating the circuit breaker to open the power circuit aforesaid simultaneously with an emergency application of the brakes.

9. A safety car stop comprising in combination with car equipment including a main electric power circuit with an interposed circuit breaker, and brake system; an auxiliary circuit with electrically operated means for actuating the circuit breaker aforesaid to open the power circuit, and a normally open switch in the auxiliary circuit adapted to be closed simultaneously with an emergency application of the brakes by means coordinated with the brake system.

10. A safety car stop comprising in combination with car equipment including a main electric power circuit with an interposed circuit breaker, and an air brake system; an auxiliary circuit with electrically operated means for actuating the circuit breaker aforesaid to open the power circuit, a normally open switch in the auxiliary circuit adapted to be closed simultaneously with an emergency application of the brakes by means coordinated with the brake system, and instrumentalities whereby the auxiliary circuit is always connected to the main power circuit except when the controller is on the first point of power or in off position.

11. A safety car stop comprising in combination with car equipment including a main electric power circuit with an interposed controller and circuit breaker, and an air brake system; an auxiliary circuit with electrically operated means for actuating the circuit breaker to open the main circuit aforesaid, a normally open switch adapted to be closed simultaneously with an emergency application of the brakes by means coordinated with the brake system, a rotary switch segment mounted on the stem of the controller cooperative with a stationary contact member whereby the auxiliary circuit is energized from the main power circuit, the extent of said segment being such that the auxiliary circuit is always connected except when the controller is on the first point of power or in off position.

12. A safety car stop comprising in combination with car equipment including a main electric power circuit with an interposed circuit breaker, a brake system and sanding device; means coordinated with the brake system for actuating the circuit breaker to open the main circuit and initiating the activity of the sanding device simultaneously with an emergency application of the brakes with two or more points of power applied.

13. A safety car stop comprising in combination with the car equipment including a brake system, and emergency doors; means for maintaining the operating mechanism of the doors locked against tampering during normal running of the car but capable, through coordination with the brake system, of being unlocked for free operation simultaneously with an emergency application of the brakes with two or more points of power applied.

14. A safety car stop comprising in combination with car equipment including a power circuit with a circuit breaker, an air brake system with an interposed control valve; a valve handle capable of automatically shifting to emergency position upon removal of the hand of the operative, and means coordinated with the brake system for actuating the circuit breaker to open the main circuit simultaneously with the shifting of the valve handle to effect an emergency application of the brakes.

15. A safety car stop comprising in combination with car equipment including a main electric power circuit with an interposed circuit breaker, a brake system, a sanding device, and emergency doors with operating mechanism locked against tampering during normal running of the car; an auxiliary circuit with electrically actuable means for respectively opening the circuit breaker, initiating the operation of the sanding device and releasing the doors for free operation, and a normally open switch in the auxiliary circuit adapted to be closed simultaneously with an emergency application of the brakes by means coordinated with the brake system.

In testimony whereof, I have hereunto signed my name at Philadelphia, Pennsylvania, this 14th day of August, 1922.

FRANK L. HINMAN.

Witnesses:
JAMES H. BELL,
E. L. FULLERTON.